(12) United States Patent
Leiston

(10) Patent No.: US 8,312,700 B2
(45) Date of Patent: Nov. 20, 2012

(54) TINE ASSEMBLY

(75) Inventor: Michael Thomas Leiston, Rochester, NY (US)

(73) Assignee: Oxbo International Corporation, Byron, NY (US)

( * ) Notice: Subject to any disclaimer, the term of this patent is extended or adjusted under 35 U.S.C. 154(b) by 0 days.

(21) Appl. No.: 12/754,407

(22) Filed: Apr. 5, 2010

(65) Prior Publication Data

US 2011/0239606 A1  Oct. 6, 2011

(51) Int. Cl.
*A01D 46/08* (2006.01)

(52) U.S. Cl. .......................................... 56/12.4

(58) Field of Classification Search ............... 56/14.4, 56/364, 400, 12.4, 12.5; 172/634, 707
See application file for complete search history.

(56) References Cited

U.S. PATENT DOCUMENTS

| | | | | |
|---|---|---|---|---|
| 2,839,885 | A * | 6/1958 | Eischens | 56/364 |
| 3,151,436 | A * | 10/1964 | Johnston | 56/400 |
| 3,206,920 | A * | 9/1965 | Hofer | 56/364 |
| 3,401,515 | A * | 9/1968 | Fishbaugh | 56/400 |
| 3,481,125 | A * | 12/1969 | Miller | 56/400 |
| 3,553,950 | A * | 1/1971 | Waser | 56/400 |
| 3,616,631 | A | 11/1971 | Quam | |
| 3,698,172 | A * | 10/1972 | Johnston | 56/400 |
| 3,834,140 | A * | 9/1974 | Delfino | 56/400 |
| 3,859,777 | A * | 1/1975 | Doering | 56/16.7 |
| 4,026,364 | A | 5/1977 | Vander Lely | |
| 4,037,669 | A | 7/1977 | Vander Lely et al. | |
| 4,235,294 | A | 11/1980 | Barlage | |
| D263,233 | S | 3/1982 | Vander Lely | |
| 4,473,994 | A * | 10/1984 | Hein | 56/400 |
| 4,481,758 | A * | 11/1984 | Fishbaugh | 56/400 |
| 4,495,755 | A * | 1/1985 | Johnson | 56/364 |
| 4,520,620 | A | 6/1985 | Gessel et al. | |
| D289,172 | S | 4/1987 | Bolinger | |
| 4,660,362 | A * | 4/1987 | Klinner | 56/364 |
| 4,706,448 | A | 11/1987 | Gessel et al. | |
| 4,745,736 | A * | 5/1988 | Copley | 56/400 |
| 4,751,811 | A * | 6/1988 | Groothuis | 56/364 |
| 4,776,155 | A | 10/1988 | Fox et al. | |
| 4,901,511 | A | 2/1990 | Yarmashev et al. | |
| 5,987,861 | A | 11/1999 | Duncan et al. | |
| 6,314,709 | B1 | 11/2001 | McClure et al. | |
| 6,910,323 | B2 | 6/2005 | Bickel | |

(Continued)

OTHER PUBLICATIONS

Implement & Tractor, Jan. 7, 1978, p. 42, New Holland Tooth, model L-I 00/2323, 1 page (bottom right).

(Continued)

*Primary Examiner* — Thomas B Will
*Assistant Examiner* — Mai Nguyen
(74) *Attorney, Agent, or Firm* — Merchant & Gould PC

(57) ABSTRACT

A tine assembly is used with an agricultural machine such as a harvester or hay merger. The tine assemblies mount on a reel that rotates about an axis extending transverse to the direction of travel. The tine assembly includes a first tine and a second tine, each having a main extended portion and a lateral portion extending transverse to the main portion at a mounting end of the tines. The lateral portions mount into tabs or opposite ends of a sleeve. The sleeve or tabs and mounting end of the tines are enclosed by a molded mounting portion that also includes a reinforcing arcing element configured for mounting to the reel bar. The arcing element includes orifices that allow for easily bolting and unbolting the tine assemblies for easy attachment and removal.

16 Claims, 7 Drawing Sheets

U.S. PATENT DOCUMENTS

| | | | |
|---|---|---|---|
| 7,127,876 B2 * | 10/2006 | Ligouy | 56/16.4 R |
| 7,757,470 B2 | 7/2010 | Schumacher et al. | |
| 2003/0110752 A1 * | 6/2003 | Dow | 56/364 |

OTHER PUBLICATIONS

Oxbo Corporation, Drawings of Double Rubber Mounted Finger Assembly, Admitted Prior Art Aug. 17, 2006.

Oxbo Corporation, Drwaings of Double Rubber Mounted Pick-up Tooth, Admitted Prior Art Jul. 30, 2008.

Exhibit A, Pixall LLC, photos of Tine, one (1) page.
Exhibit B, Herschel Corporation, photos of Tine, one (1) page.
Exhibit C, photos of Tine, one (1) page.
Exhibit D, photos of Tine, one (1) page.
Exhibit E, photos of Tine, one (1) page.
Exhibit F, photos of Tine, one (1) page.
Exhibit G, Pixall LLC, photos of Tine, two (2) pages.
Exhibit H, Pixall LLC, photos of Tine, two (2) pages.

* cited by examiner

TINE ASSEMBLY

BACKGROUND OF THE INVENTION

1. Field of the Invention

The present invention relates to tines for agricultural machinery and in particular to tines that mount in pairs on a harvester reel.

2. Description of the Prior Art

Harvesters, balers and mergers such as may be used for picking up and/or harvesting hay, beans and other agricultural products are well known and provide for mechanized pick up of agricultural products from the field. The crop is typically either picked up from a windrow, which has been laid by other machinery, or directly cut from the ground. Such harvesting devices generally include a tine reel having a plurality of tines or sets of tines spaced along a transverse axis that engage the agricultural product near the ground and propel it up over the reel and rearward. The crop is delivered from the head to a conveying system and to further processing machinery where some crops, such as hay are baled or chopped further. Hay mergers have a fundamentally different head that includes conveyors associated with the reels that transport hay to one end or the other for creating windrows. Other crops are delivered as cut to storage bins on the harvester or to trucks and/or trailers.

In a conventional mounting configuration, the tines mount along bars extending along the width of the reel. The tines may become damaged or suffer from wear and are advantageously configured for quick and easy removal and replacement. It is also important for the tines to flex sufficiently to reduce breakage. Tines are made of materials that provide for a degree of pivoting and/or bending should the tines engage the ground or other obstructions in the path of the harvester.

A common mounting configuration includes a tine assembly with a pair of tines sharing a mount that is attached with a bolt or other conventional devices to the reel bars. Such designs provide for faster mounting and removal of tines, leading to quicker maintenance and decreasing down time for the machine. Guards, also known as strippers, are spaced intermediate the sets of tines and generally wrap around the majority of the reel. The head may become damaged due to striking uneven terrain, rocks and other debris in its path. The guards act as a shield for the head and help to direct the crop and other matter to prevent damage to the interior elements of the reel and to maintain a clear material flow path.

Although double-tine designs have proven to provide an effective tine system, further improvements are possible. Such double tine assemblies may utilize a metal U-shaped element to form each tine pair with the inner portions of the tines set in a molded rubber base. However, such a design may not provide optimum flexing between the two tines of each assembly. Therefore, rocks and other debris may be picked up and fed through the agricultural machinery along with the agricultural products. Such debris may cause damage to other components and systems and may require extra inspection and cleaning to ensure a contaminant free product. The tine assemblies may not provide sufficient axial pivoting or flexure and/or adequate lateral flexure between the tine pair without breaking the mounting portion.

Some prior art tine designs may provide satisfactory pivoting or flexure about the head axis; these designs typically suffer from insufficient lateral flexure between the tines of the two tine assembly to keep the tines rotating in the same plane. To overcome such problems, some designs incorporate an external guide for reinforcement on the two tine assembly to prevent lateral flexure. However, the external guides increase the complexity and costs of the heads.

It can be seen that a new and improved system for mounting tines to reel bars of agricultural machinery with an improved tine design is needed. Such a system should provide an inexpensive, durable and lightweight tine system with simple mounting providing quick and easy replacement. Such a tine system should provide for mounting the tines as tine assemblies to the reel with each assembly having a pair of tines. The tines should provide sufficient stiffness to pick up the desired agricultural products while flexing relative to one another about the reel axis to avoid picking up rocks and other debris. A tine assembly should minimize the amount of lateral flexure to prevent a tine from crossing into an adjacent slot and maintain the tines in a straight path between the correct guides or strippers without the need for external guides. The present invention addresses these as well as other problems associated with harvester tines.

SUMMARY OF THE INVENTION

The present invention is directed to an agricultural machine using tine assemblies having multiple sets of tine pairs used on a reel.

Many types of agricultural implements including various harvesters and hay mergers include a reel having tines extending radially therefrom and spaced along the reel. The reel generally rotates about an axis extending transverse to the direction of travel. The tines therefore rotate generally upward along the front face of the agricultural machine. Guards or strippers extend annularly about the reel rotational axis and define slots therebetween spaced axially along the head and allow for the tines of the reel to travel in a path between the guards.

The tine assemblies mount to reel bars supported on a framework extending around the reel axis with the tines extending radially outward and projecting through the openings between adjacent guards. Each tine assembly of the present invention includes a pair of tines. In one embodiment, the tines include a main portion and an angled end portion. The tines include lateral inner portions that extend transversely. The lateral portions are configured so that the tines are left handed and right handed to form a dual tine assembly. The lateral portions extend into a sleeve with the tines extending parallel to one another. The sleeve is connected by a molded mounting portion to an arcing mounting element that attaches to the reel bar. The molded mounting portion is typically made of rubber or other elastomer material that provides some flexure. The tine assembly provides for maintaining lateral spacing of the individual tines relative to one another. Moreover, the tine assembly provides for sufficient pivoting and flexure of the individual tines relative to one another so that breakage is minimized while providing enough stiffness to pick up the desired agricultural products. Moreover, the tines flex sufficiently so that rocks and other obstacles that have greater resistance may be engaged, but are generally not picked up by a single tine due to sufficient flexing and/or pivoting. The sleeve also reduces the lateral flexure to maintain the tines in the same rotational plane transverse to the reel axis and allows the tines to extend from a location closer to an outer edge of the mounting portion, thereby reducing weight and cost.

The tine assemblies include mounting orifices extending through the arcing element that allow for simply bolting and unbolting the tine assemblies to the reel bars. This configuration provides for quick and easy attachment and detachment of the tine assemblies so that replacement of missing or damaged tines may be easily accomplished by simply interchanging a new tine assembly by unbolting and bolting.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings wherein like reference numerals and letters indicate corresponding structure throughout the several views.

DETAILED DESCRIPTION OF THE PREFERRED EMBODIMENT

Figure 1:
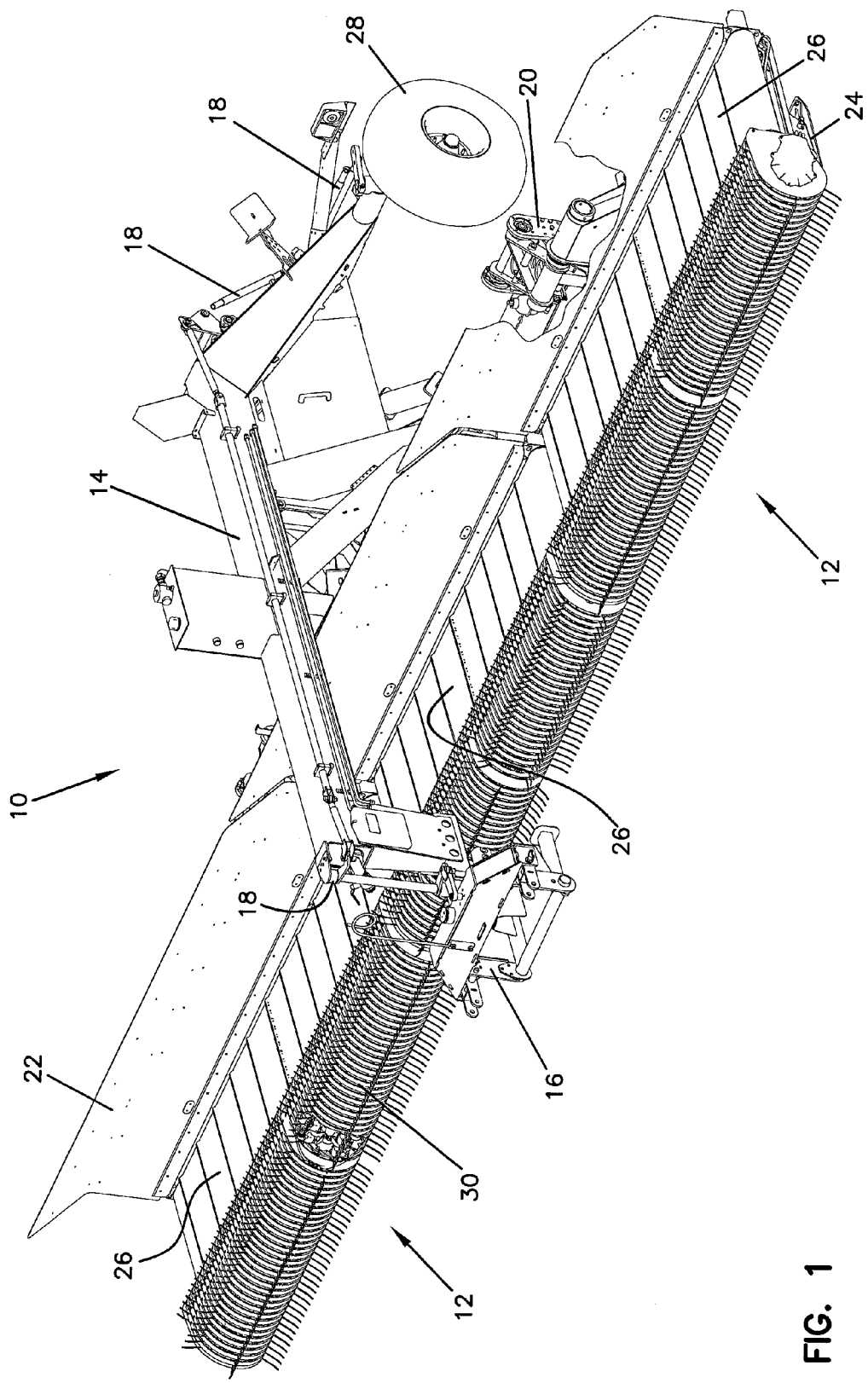
FIG. 1 is a perspective view of agricultural machinery utilizing tine assemblies according to the principles of the present invention.

Referring now to the drawings and in particular to FIG. 1, there is shown an agricultural implement, generally designated 10. In the embodiment shown, the agricultural machinery 10 is a hay merger, however it can be appreciated that several types of harvesters and other agricultural implements may also utilize the tines of the present invention.

Figure 2:
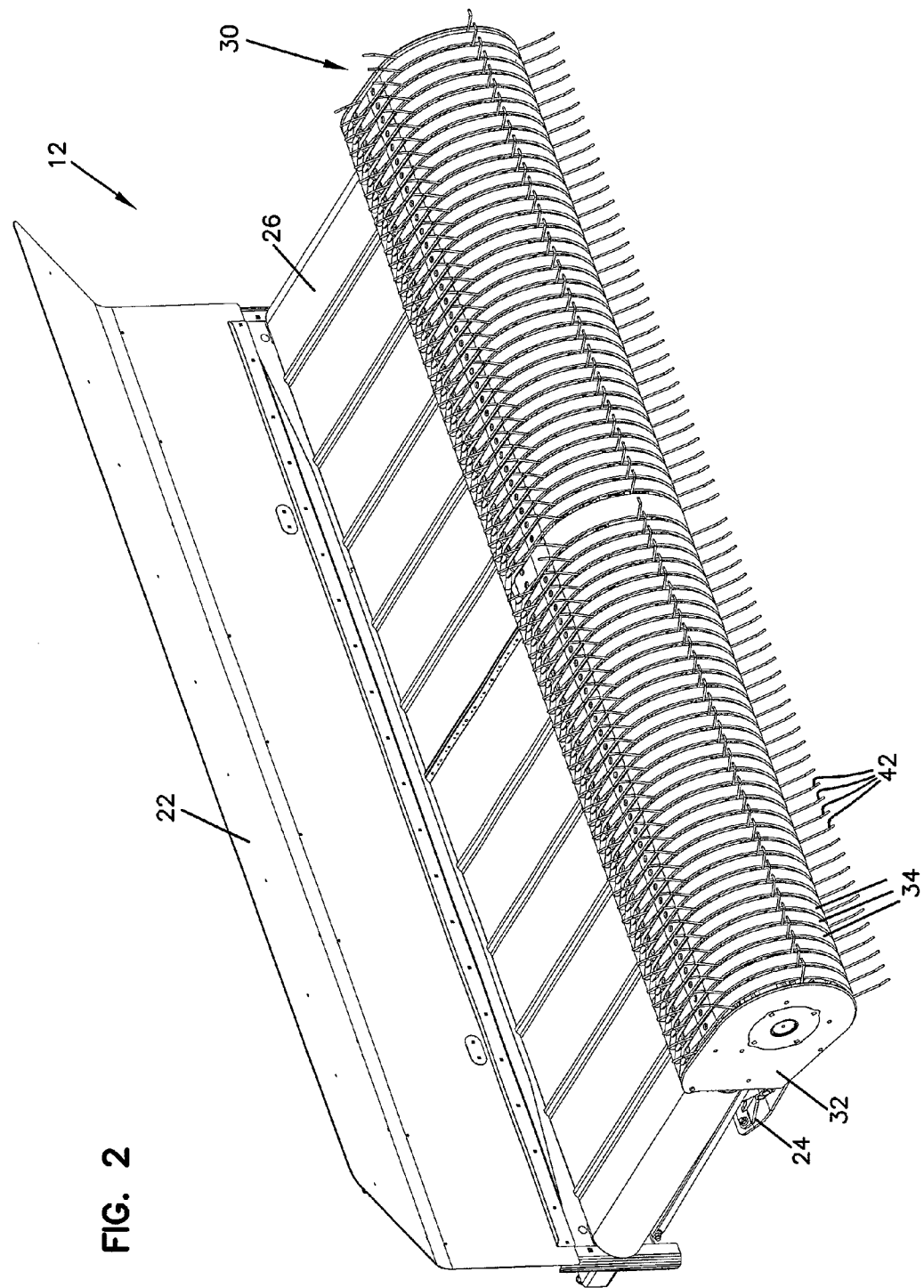
FIG. 2 is perspective view of a head assembly for the agricultural machinery shown in FIG. 1.

A conventional merger includes heads 12 mounted on a frame 14. Some agricultural machines may be self propelled while others will be pulled by a tractor with a hitch 16. The merger also includes a steering linkage 18 for improved tracking of wheels 28. Each of the heads 12 include a reel 30 that picks up hay and delivers it to an associated conveyor 26. Shrouds 22 prevent the hay from being thrown too far back beyond the conveyors 26. As shown in FIG. 2, skids or wheels 24 help to support the heads 12 and maintain them at the proper operating position. In the merger shown, the heads 12 may be advantageously retracted to a storage or travel position through folding linkages 20.

Each head 12 is generally configured with the reel 30 having a face rotating on an axis extending transverse to the direction of travel. The conveyor 26 is positioned directly behind the reel 30 and moves in a direction parallel to the reel axis and transverse to the direction of travel. It can be appreciated that the conveyor 26 may be reversible to move hay either to the left or right depending upon the desired conditions and particular requirements. The reel 30 includes end plates 32 and guards or strippers 34 extending about the rotational axis of the reel 30. The guards 34 define an arcing protective shield around the axis and other internal components of the reel 30. Tines 42 extend radially outward through the gaps formed between the adjacent strippers 34 spaced axially along the reel 30. The tines 42 rotate to pull hay or other agricultural products upward and throw them rearward. The shroud 22 prevents the materials from being thrown beyond the conveyor 26.

Figure 3:
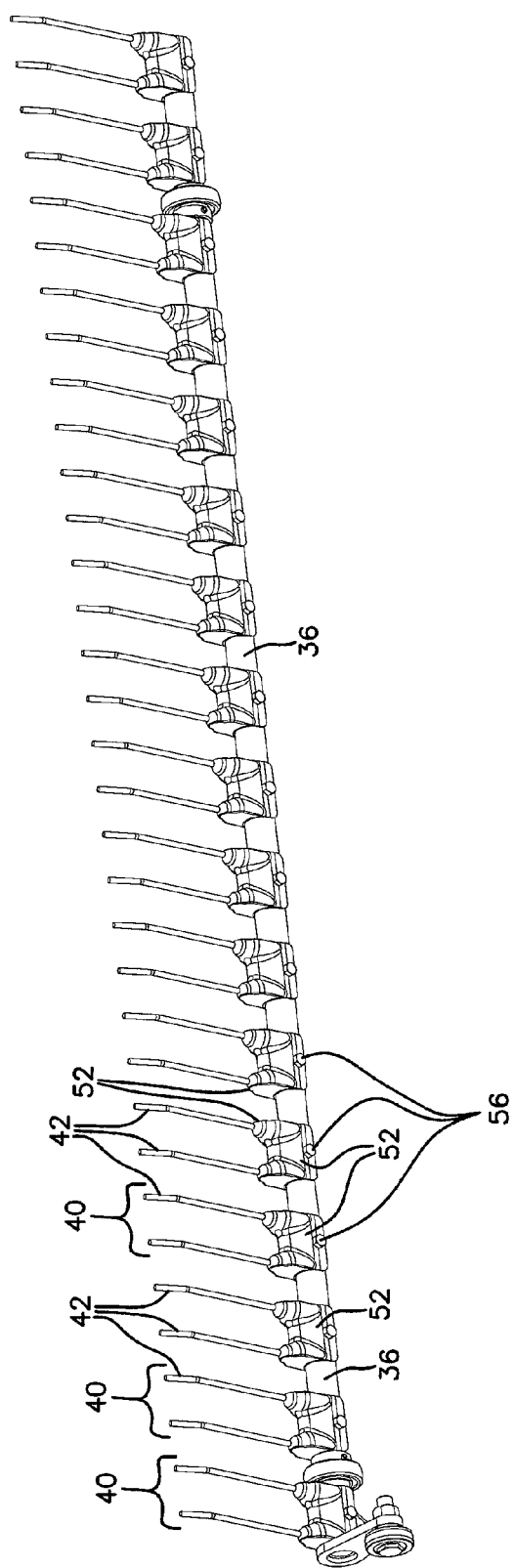
FIG. 3 is perspective view of a mounting bar for the head assembly shown in FIG. 2 having a plurality of tine assemblies mounted to the bar.
Figure 4:
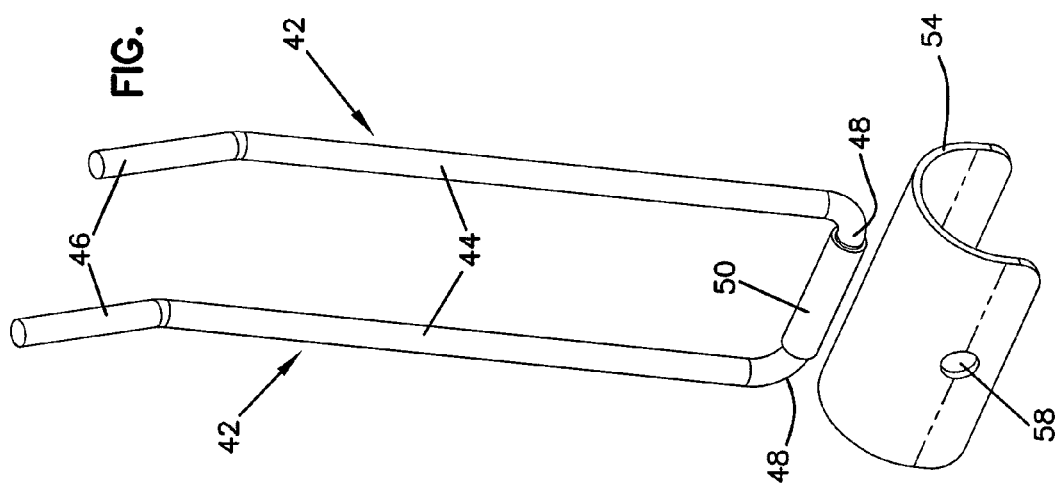
FIG. 4 is a perspective view of a first embodiment of a tine assembly for the mounting bar shown in FIG. 3 with portions shown in phantom for clarity.
Figure 5:
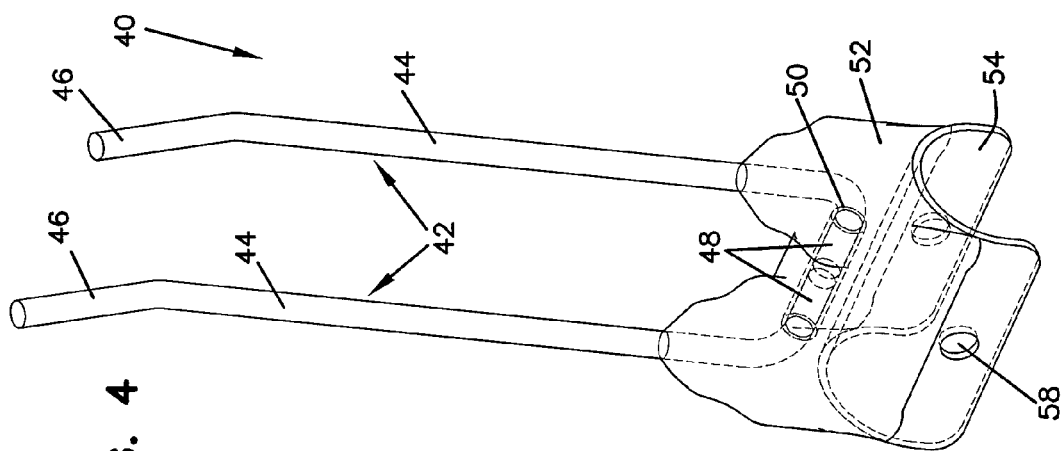
FIG. 5 is a perspective view of the tine assembly shown in FIG. 4 with the rubber mounting portions removed.

Referring now to FIG. 3, the tines 42 extend from tine assemblies 40 mounted along a reel bar 36. Bolts 56 extend through a bar 36 and mounting portions 52 of the tine assemblies 40 to retain the tine assemblies 40 on the reel bar 36. As shown more clearly in FIGS. 4 and 5, each tine assembly 40 has first and second tines 42. Each tine 42 includes a main portion 44 and a lateral portion 48 extending transversely to the main portion 44. End portion 46 extends at a slight angle to the main portion 44 in some embodiments. In the embodiment shown, the lateral portions 48 extend toward one another so that the tines 42 are configured as a left hand version and a right hand version in each pair of an assembly 40. The lateral portions 48 insert into a tine mount configured as a sleeve 50 in the embodiment shown in FIGS. 4 and 5. The sleeve 50 provides for holding the tines 42 laterally relative to one another and providing limited pivoting about the mounting bar. A molded mounting portion 52 extends over the lateral portions and sleeve 50 as well as a section of the main portion 44 of the tines 42. The sleeve 50 provides for support to prevent the main portions 44 from moving laterally outward. An arcing element 54 is also molded into a lower section of the mounting portion 52. The arcing element 54 includes aligned orifices 58 that receive the mounting bolts 56, as shown in FIG. 3. The orifices 58 are aligned for easy attachment and removal using a conventional bolt or other fastener 56. Moreover, the tine assemblies 40 are easily manufactured by inserting the tines 42 into the sleeve 50 and then placing the tines 42, sleeve 50 and the arcing element 54 in a mold with the material injected into the mold to form the mounting portion 52. The sleeve 50, the arcing element 54, and the mounting portion 52 provide satisfactory mounting and support to minimize lateral flexure.

Figure 6:
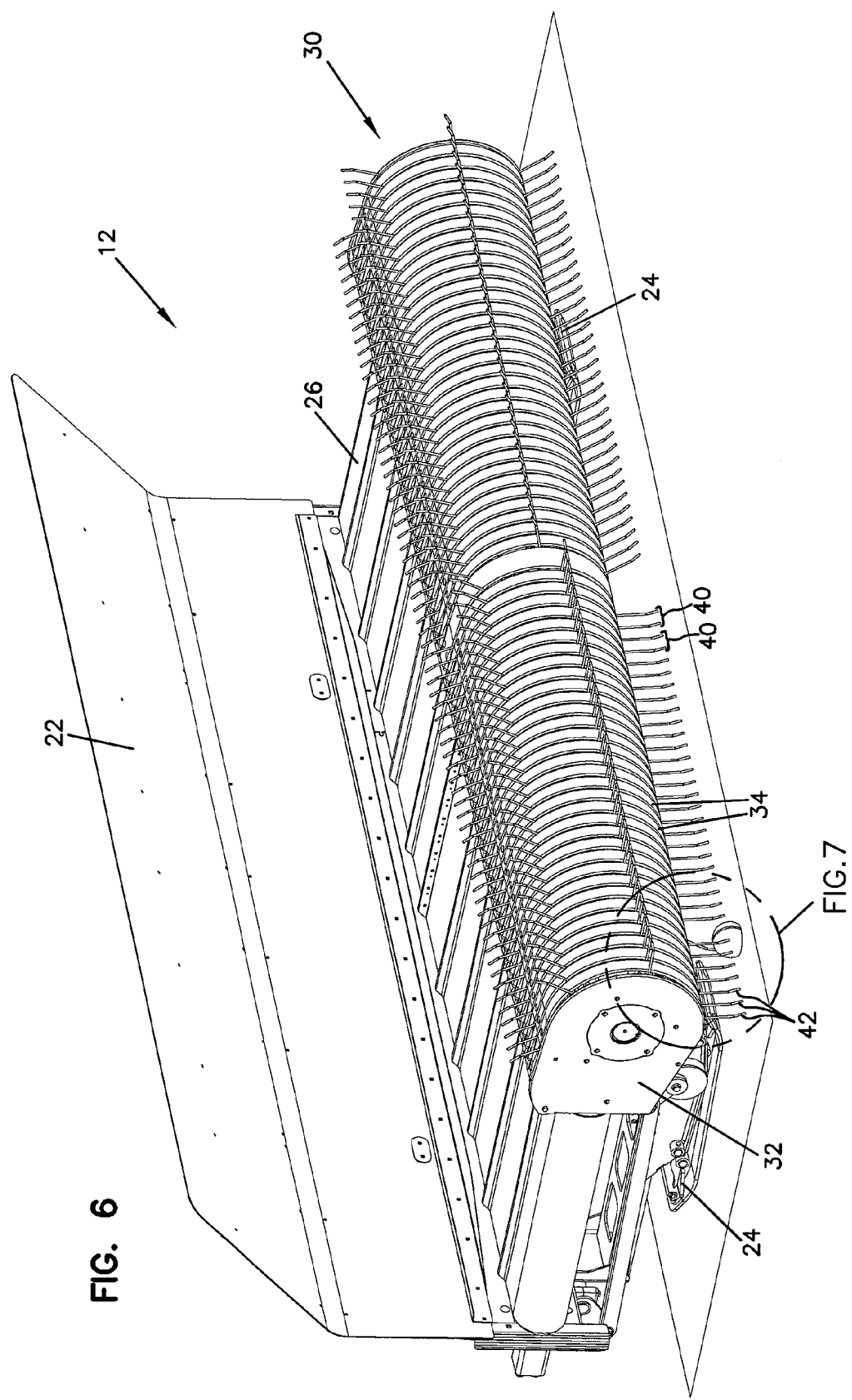
FIG. 6 is a perspective view of the head assembly shown in FIG. 2 and tines engaging an obstacle.
Figure 7:
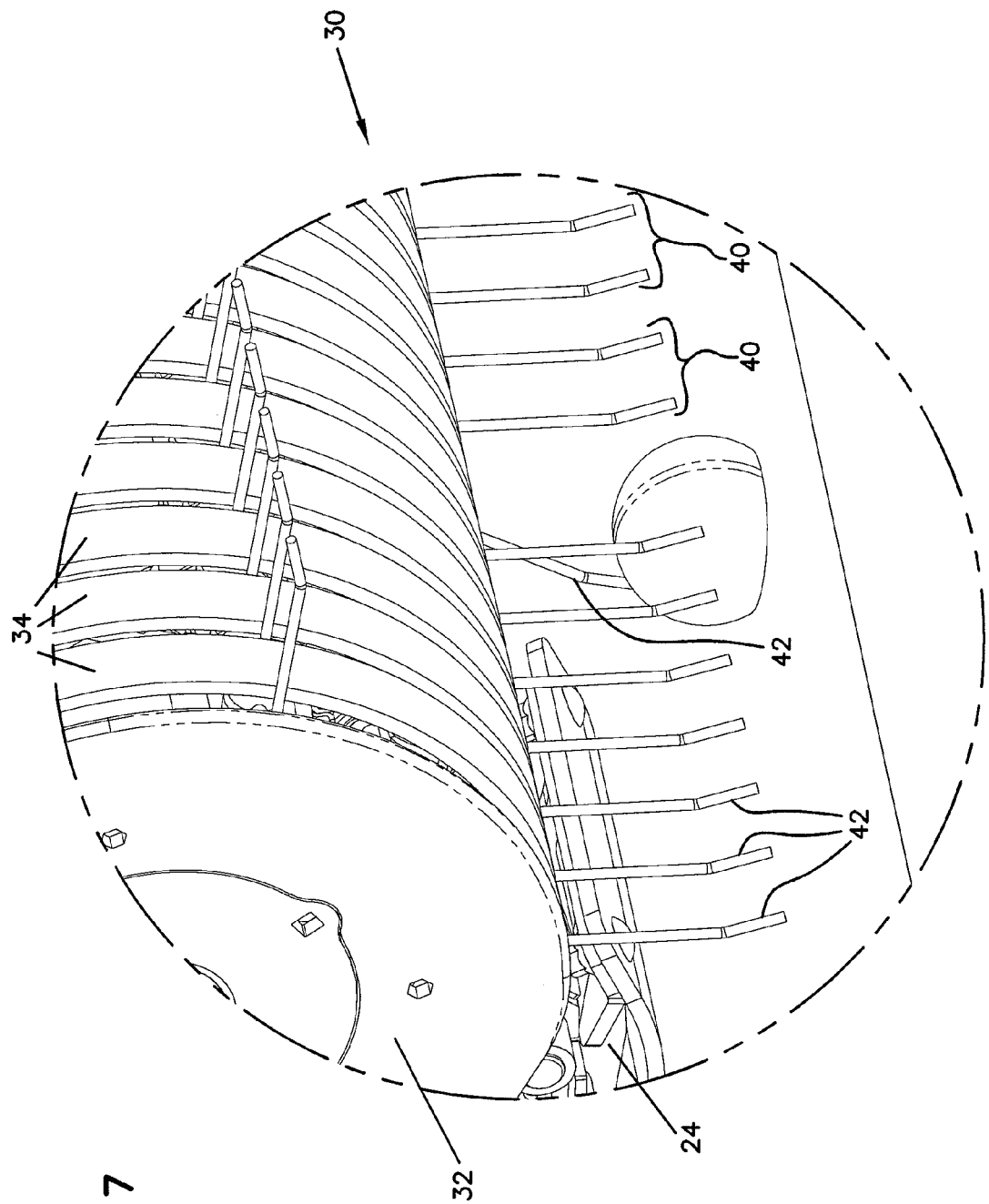
FIG. 7 is a detail perspective view of a portion of the head assembly shown in FIG. 6 engaging an obstacle.

Referring now to FIGS. 6 and 7, the tine assemblies 40 provide for superior performance and resiliency without breaking. When an object such as a rock or other obstruction is encountered, the tine assemblies 40 provide for allowing one or more of the tines 42 to pivot and/or flex so that the heavier rock or other obstacle is not picked up and thrown onto a conveyor with the desired agricultural product. Moreover, the tine assemblies 40 provide for allowing each tine 42 to move separately forward and backward along the rotational direction to minimize the amount of rocks and debris picked up. The configuration provides for superior flexing of each tine 42 so that the left or right tine 42 of each tine assembly 40 may flex or pivot in the rotational plane independently of the other while limiting lateral flexure. This independent pivoting or flexure from each tine 42 of the tine pair assembly 40 is not possible with prior art configurations to the degree achieved by the present invention.

The present invention provides for tines 42 and tine assemblies 40 that reduce the unwanted debris that is picked up from the field. The tine assemblies 40 provide sufficient rigidity without breaking and flex to reduce damage while maintaining superior performance. Should one of the tines 42 be broken or bent, the present invention provides for simply releasing a guard and unbolting the damaged tine assembly 40 and bolting a new assembly 40 in its place. Down time is reduced and efficiency is thereby increased.

Figure 8:
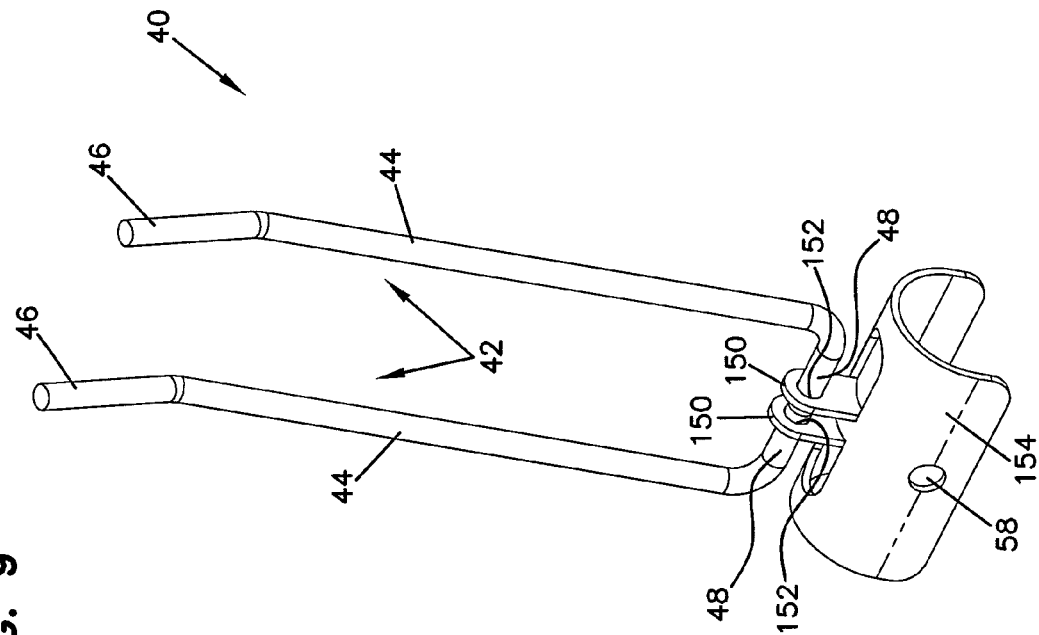
FIG. 8 is a perspective view of a second embodiment of a tine assembly according to the principles of the present invention.
Figure 9:
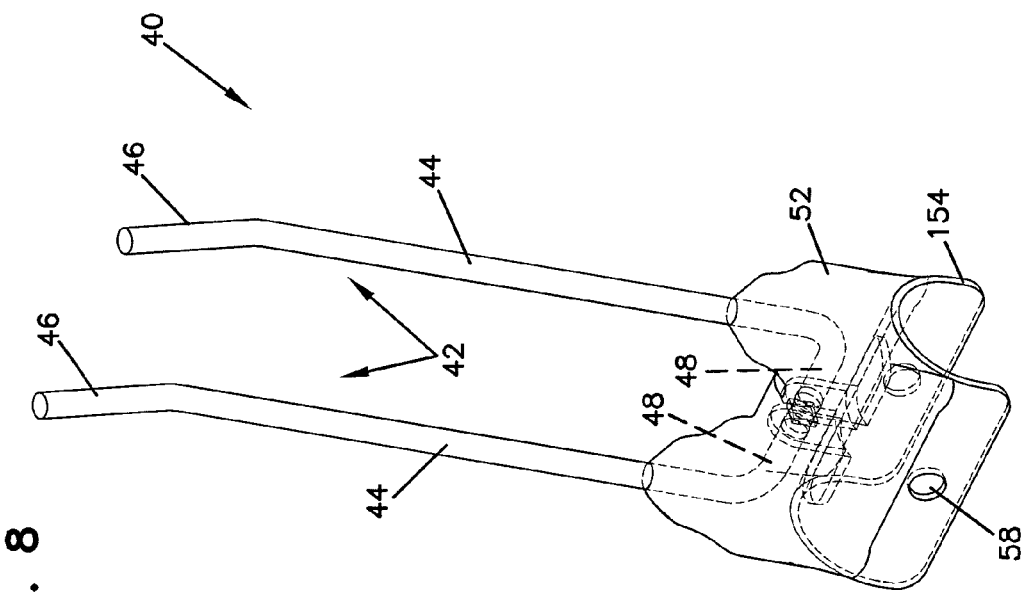
FIG. 9 is a perspective view of the tine assembly shown in FIG. 8 with portions shown in phantom for clarity.

Referring now to FIGS. 8 and 9, there is shown a second embodiment of a tine assembly, generally designated 140. As with tine assembly 40 each tine assembly 140 has first and second tines 42 having a main portion 44 and a lateral portion 48 extending transversely to the main portion 44. The end portion 46 may extend at a slight angle to the main portion 44. In the embodiment shown in FIGS. 8 and 9, the lateral portions 48 extend toward one another so that the tines 42 are configured as a left hand version and a right hand version in each pair of an assembly 40. The lateral portions 48 insert a tine mount configured as a pair of tabs 150 extending up from an arcing element 154 in the embodiment of FIGS. 8 and 9. Each of the tabs 150 has an orifice 152 receiving a lateral portion 48 of one of the tines 42. The tabs 150 and orifices 152 provide for holding the tines 42 laterally relative to one another and providing limited pivoting about the mounting bar. Molded mounting portion 52 extends over the lateral portions 48 and the tabs 150 as well as a section of the main portion 44 of the tines 42 and the arcing element 154. The arcing element 54 includes aligned orifices 58 that receive the mounting bolts 56, as shown in FIG. 3, and mounts in the same manner as described above for tine assemblies 40. It can be appreciated that the tine assemblies 140 provide improved mounting and flexure characteristics similar to those described above for the tine assemblies 40.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A tine assembly, comprising:
   a flexing first tine having a main portion and a lateral portion at a first end of the main portion;
   a flexing second tine having a main portion and a lateral portion at a first end of the main portion, the lateral portion of the first tine and the lateral portion of the second tine extending toward one another in a tine mount;
   a molded elastic mounting body configured for mounting to a head for agricultural implements, the molded elastic mounting body being molded around a portion of the main portion of the first and second tines; and
   a sleeve embedded within and surrounded by the molded elastic mounting body and receiving and surrounding ends of the lateral portions of the first and second tines, the lateral portions of the first and second tines rotatably mounting in the sleeve.

2. A tine assembly according to claim 1, wherein the first tine and the second tine are parallel.

3. A tine assembly according to claim 1, wherein a second end of the first and second tines includes a portion extending at an oblique angle to the main portion.

4. A tine assembly according to claim 1, wherein the mounting body includes a mounting portion configured for being attached to a reel bar on the head.

5. A tine assembly according to claim 1, wherein the mounting body comprises an arcing element configured for being bolted to a reel bar on the head.

6. A tine assembly according to claim 1, wherein the mounting body comprises an arcing surface configured for extending around a portion of a reel bar on the head.

7. A tine assembly according to claim 5, wherein the arcing element comprises aligned mounting holes configured for receiving a fastener extending through the reel bar.

8. A tine assembly according to claim 1, wherein ends of the lateral portions of the first and second tines are spaced apart from one another in the tine mount.

9. A head for agricultural machinery comprising:
   a reel configured for rotating around an axis extending generally transverse to a direction of travel;
   a plurality of parallel bars mounted about a periphery of the reel;
   a plurality of tine assemblies mounted to each of the bars, each of the tine assemblies comprising:
   a flexing first tine having a main portion and a lateral portion at a first end of the main portion;
   a flexing second tine having a main portion and a lateral portion at a first end of the main portion;
   a molded elastic mounting body configured for mounting to one of the parallel bars; and
   a sleeve embedded in and surrounded by the mounting body and receiving the lateral portions of the first and second tines in opposite ends of the sleeve, the sleeve surrounding ends of the lateral portions of the first and second tines so the lateral portions of the first and second tines rotatably mount in the sleeve.

10. A head for agricultural machinery according to claim 9, further comprising a reel guard extending annularly intermediate laterally adjacent tines along the parallel bars.

11. A head for agricultural machinery according to claim 9, further comprising a conveyor assembly proximate a rear portion of the reel.

12. A mechanized agricultural implement comprising:
   a head having a reel configured for rotating around an axis extending generally transverse to a direction of travel;
   a plurality of parallel reel bars mounted about a periphery of the reel;
   a plurality of tine assemblies mounted to each of the parallel reel bars, each of the tine assemblies comprising:
   a flexing first tine having a main portion and a lateral portion at a first end of the main portion;
   a flexing second tine having a main portion and a lateral portion at a first end of the main portion;
   a molded elastic mounting body configured for mounting to one of the parallel reel bars; and
   a sleeve embedded in and surrounded by the mounting body and receiving the lateral portions of the first and second tines in opposite ends of the sleeve, the lateral portions of the first and second tines providing rotation between the lateral portions and the sleeve with the sleeve surrounding ends of the lateral portions of the first and second tines.

13. A mechanized agricultural implement according to claim 12, the head further comprising a conveyor assembly proximate a rear portion of the reel.

14. A tine assembly, comprising:
   a flexing first tine having a main portion and a lateral portion at a first end of the main portion extending in a first direction;
   a flexing second tine having a main portion parallel to the main portion of the first tine, and a lateral portion at a first end of the main portion extending in a second direction opposite the first direction;
   a molded elastic mounting body configured for mounting to a head for agricultural machinery;

a sleeve embedded in and surrounded by the mounting body and receiving and surrounding the lateral portions of the first and second tines in opposite ends of the sleeve so the lateral portions of the first and second tines rotatably mount in the sleeve; and an arcing mounting element at least partially embedded into the mounting body configured for extending around a portion of a reel bar of the head.

15. A tine assembly according to claim 14, wherein a second end of the first and second tines includes a portion extending at an oblique angle to the main portion.

16. A tine assembly according to claim 14, wherein ends of the lateral portions of the first and second tines are spaced apart from one another in the sleeve.

* * * * *